(12) United States Patent  
Kunter et al.

(10) Patent No.: US 11,292,711 B1  
(45) Date of Patent: Apr. 5, 2022

(54) DISPENSING NOZZLE

(71) Applicant: ELAFLEX HIBY GmbH & Co. KG, Hamburg (DE)

(72) Inventors: Stefan Kunter, Hamburg (DE); Sebastian Viets, Moisburg (DE)

(73) Assignee: ELAFLEX HIBY GMBH & CO. KG, Hamburg (DE)

(*) Notice: Subject to any disclaimer, the term of this patent is extended or adjusted under 35 U.S.C. 154(b) by 0 days.

(21) Appl. No.: 17/484,591

(22) Filed: Sep. 24, 2021

(30) Foreign Application Priority Data

Sep. 29, 2020 (EP) ..................................... 20198851

(51) Int. Cl.
| | |
|---|---|
| *B67D 7/52* | (2010.01) |
| *B67D 7/32* | (2010.01) |
| *B67D 7/04* | (2010.01) |

(52) U.S. Cl.
CPC ................. *B67D 7/52* (2013.01); *B67D 7/04* (2013.01); *B67D 7/3281* (2013.01)

(58) Field of Classification Search
CPC ........... B67D 7/04; B67D 7/52; B67D 7/3281
See application file for complete search history.

(56) References Cited

U.S. PATENT DOCUMENTS

| 4,951,722 | A | * | 8/1990 | Nitzberg | .................. | B67D 7/48 |
| | | | | | | 137/499 |
| 6,311,742 | B1 | * | 11/2001 | Nusen | ..................... | B67D 7/48 |
| | | | | | | 141/198 |

(Continued)

FOREIGN PATENT DOCUMENTS

| EP | 2733113 A1 | 5/2014 |
| EP | 3369700 A1 | 9/2018 |
| WO | 2017/024209 A1 | 2/2017 |

OTHER PUBLICATIONS

European Search Report, EP Patent Application No. 20198851.6, dated Mar. 16, 2021, 5 pages.

*Primary Examiner* — Timothy P. Kelly
(74) *Attorney, Agent, or Firm* — Casimir Jones, S.C.; Brian F. Bradley (57) ABSTRACT

The subject of the invention is a dispensing nozzle for dispensing a fluid into a tank of a motor vehicle. The dispensing nozzle comprises the following features:
  the dispensing nozzle comprises a channel (30) for passing through the fluid, wherein a main valve (5) is arranged in the channel (30), said main valve being movable between a closed position and an open position for controlling a fluid flow,
  the dispensing nozzle comprises a first maximum volumetric flow rate and a second maximum volumetric flow rate, wherein the second maximum volumetric flow rate is greater than the first,
According to the invention it is provided that the dispensing nozzle comprises an adjustable flow limiter (22) which is arranged downstream of the main valve (5) and which is configured to limit the fluid flow selectively to the first or second maximum volumetric flow rate. The dispensing nozzle also comprises an actuating device (20, 21) which is configured for interaction with a signal element (29) which is assigned to the tank of the motor vehicle and for the selective adjustment of the flow limiter (22) to the first or the second maximum volumetric flow rate. By the provision of a flow limiter which is adjustable due to an interaction with the signal element, a rapid and reliable filling of different-sized containers containing liquid is ensured in a structurally simple manner.

20 Claims, 4 Drawing Sheets

(56) References Cited

U.S. PATENT DOCUMENTS

| | | | |
|---|---|---|---|
| 10,961,110 B2* | 3/2021 | Moyne | B67D 7/52 |
| 2014/0130939 A1* | 5/2014 | Kunter | B67D 7/02 141/198 |
| 2018/0251367 A1* | 9/2018 | Kunter | B67D 7/02 |

* cited by examiner

DISPENSING NOZZLE

The subject of the present invention is a dispensing nozzle for dispensing a fluid into a tank of a motor vehicle. The dispensing nozzle comprises a channel for passing through the fluid as well as a main valve which is arranged in the channel, said main valve being movable between a closed position and an open position for controlling a fluid flow through the dispensing nozzle. The dispensing nozzle also comprises a first adjustable maximum volumetric flow rate and a second adjustable maximum volumetric flow rate, wherein the second maximum volumetric flow rate is greater than the first maximum volumetric flow rate.

Such a dispensing nozzle is disclosed in EP 3 369 700 A1. Said dispensing nozzle serves, for example, to fill the tank of a vehicle with an aqueous urea solution (also known by the name AdBlue). This urea solution is required for many newly registered diesel motor vehicles due to strict exhaust emission standards, in order to reduce nitrogen oxide emissions generated during the combustion process. Since the first or second maximum volumetric flow rate may be selectively adjusted by the interaction of the sensor device with a signal element of the tank, the maximum volumetric flow rate may be adapted to the tank to be filled. In particular, it may be provided that in the case of a large tank with a correspondingly large capacity, for example designed according to ISO 22241-4, the larger second maximum volumetric flow rate is adjusted such that a rapid filling may be carried out in spite of the size of the tank. In the case of a small tank, for example designed according to ISO 22241-5, in which volumetric flow rates which are too large could lead to disruptions or interruptions to the dispensing of fluid, it may be provided that the smaller first maximum volumetric flow rate is adjusted such that disruptions or interruptions are reliably avoided.

For adjusting the first or second maximum volumetric flow rate, it has been proposed in EP 3 369 700 A1 to implement the first and second maximum volumetric flow rate by limiting the maximum open position of the main valve, wherein an interaction between a signal element of the tank and the main valve takes place via an automatic switch-off device of the dispensing nozzle. Whilst this solution permits a reliable and safe adjustability of the first and second maximum volumetric flow rate, the solution is structurally complex since an intervention is required in the automatic switch-off device of the dispensing nozzle.

In view of this background it is the object of the present invention to provide a dispensing nozzle with a first and second maximum volumetric flow rate, which is simpler in terms of construction. This object is achieved by the features of the independent claims. Advantageous embodiments are described in the dependent claims.

According to the invention, the dispensing nozzle comprises an adjustable flow limiter which is configured separately from the main valve and which is configured to limit the fluid flow through the dispensing nozzle selectively to the first or second maximum volumetric flow rate. Moreover, the dispensing nozzle comprises an actuating device which is configured for interaction with a signal element which is assigned to the tank of the motor vehicle and for the selective adjustment of the flow limiter to the first or the second maximum volumetric flow rate.

Firstly some of the terms used within the context of the invention are explained.

A dispensing nozzle is a device for controlling the flow of liquid during a refuelling process. The requirements for the design and mode of operation of automatic dispensing nozzles for use in fuel pumps are regulated in DIN EN 13012.

The user controls the dispensing of liquid by means of the main valve. Generally a switch lever serves for actuating the main valve. The liquid is generally passed through a spout into the container to be filled.

The dispensing nozzle has an adjustable flow limiter which is configured to limit the fluid flow selectively to the first or the second maximum volumetric flow rate. This means that, at a predetermined constant fluid pressure at the inlet of the dispensing nozzle, in each case at most the respectively adjusted maximum volumetric flow rate is able to pass through by means of the flow limiter. In particular, the user is able to control the volumetric flow rate by means of a switch lever and the main valve coupled thereto, in each case only up to the respectively adjusted first or second maximum volumetric flow rate. The respectively adjusted maximum volumetric flow rate thus limits the maximum dispensing of liquid per time unit. The second maximum volumetric flow rate is greater than the first maximum volumetric flow rate. The invention is not limited to a dispensing nozzle having just two adjustable maximum volumetric flow rates, the invention also encompasses embodiments in which the flow limiter is adjustable to three or more adjustable maximum volumetric flow rates. The adjustable flow limiter is configured separately from the main valve. This means that the flow limiter is adjustable to the first or second maximum volumetric flow rate, irrespective of the state of the main valve. The flow limiter may be arranged spaced apart from the main valve, upstream or downstream of the main valve.

Since the adjustable flow limiter according to the invention is configured separately from the main valve, the selective limiting of the fluid flow takes place independently of the main valve and the automatic switch-off mechanism thereof. Thus complex modifications to the automatic switch-off mechanism and/or to the main valve are not required, whereby the construction of the dispensing nozzle may be simplified and the functional reliability increased. The arrangement of a flow limiter separately from the main valve also permits significantly simpler repairs in the case of malfunctions. The flow limiter may also be optionally configured to be retrofitted in the case of pre-existing dispensing nozzles.

In one embodiment, the flow limiter is arranged downstream of the main valve. Preferably, the flow limiter is arranged in a spout of the dispensing nozzle. By the arrangement of the flow limiter in the spout, the spout may be replaced as a separate unit so that simple repairs may be carried out in the case of malfunctions. It is also possible to retrofit dispensing nozzles by replacing the spout with the flow limiter according to the invention. The subject of the invention in this regard is also a spout for a dispensing nozzle according to the invention, wherein the spout has an adjustable flow limiter which is configured to limit the fluid flow selectively to the first or second maximum volumetric flow rate, wherein the spout also has an actuating device which is configured for interaction with a signal element assigned to the tank of the motor vehicle and for the selective adjustment of the flow limiter to the first or the second maximum volumetric flow rate. The flow limiter according to the invention may be developed by further features described in the present case in connection with the dispensing nozzle according to the invention.

The first adjustable maximum volumetric flow rate may be less than 15 l/min, preferably it is between 5 l/min and 15 l/min, further preferably between 5 l/min and 10 l/min. Additionally or alternatively, the second adjustable maximum volumetric flow rate may be less than 50 l/min, preferably it is between 10 l/min and 50 l/min, further preferably between 20 l/min and 40 l/min.

Preferably, the flow limiter is adjusted by default to the first adjustable maximum volumetric flow rate, wherein the second adjustable maximum volumetric flow rate is only adjusted when the actuating device detects the signal element. The detection of the signal element in this case may be carried out, in particular, by the interaction between the actuating device and the signal element. Since the smaller first maximum volumetric flow rate is adjusted by default, the dispensing of the smaller volumetric flow rate takes place by default, wherein larger volumetric flow rates are only discharged when it is ensured by the identification of the corresponding signal element that, due to its size, the tank to be refuelled is also suitable for the larger second maximum volumetric flow rate.

In a preferred embodiment, the actuating device is configured for interaction with a ring magnet of a filler neck according to ISO 22241-4. The signal element in this case may thus comprise a ring magnet of a filler neck according to ISO 22241-4.

The actuation of the flow limiter for selectively adjusting the first or second maximum volumetric flow rate may be carried out magnetically and/or mechanically (for example by means of spring elements) and/or pneumatically (for example by means of compressed air) and/or electrically (for example by means of an actuator). In a preferred embodiment, the actuating device has a displaceably arranged magnetic element which is designed for mechanically actuating the flow limiter. A magnetic force which is generated between the magnetic element and the ring magnet may be mechanically transmitted to the flow limiter in order to actuate said flow limiter. In particular, the magnetic element may be connected by a mechanical signal transmission device, for example by a transmission rod, to the flow limiter.

The flow limiter may have a valve body, wherein preferably the mechanical signal transmission device or, respectively, the transmission rod is connected to the valve body. The magnetic force may be transmitted via the transmission rod to the valve body in order to open or, respectively, close the flow limiter. The valve body in this case is preferably movable in a first direction when the flow limiter is actuated by the signal transmission device. Preferably, a restoring element is also provided, said restoring element being connected to the valve body and being able to be configured, in particular, to urge the valve body in a direction opposing the first direction.

The flow limiter may additionally have a valve seat, wherein the valve body is preferably movable downstream into a closed position in which it bears against the valve seat. In this embodiment, the flow limiter may also be denoted as a throttle valve. It is preferably provided that the valve body is movable into the closed position for selectively limiting the fluid flow to the first maximum volumetric flow rate and into an open position for selectively limiting the fluid flow to the second maximum volumetric flow rate. The movement into the open position may take place by the transmission of the magnetic force to the valve body by means of the signal transmission device. The movement of the valve body into the closed position may take place, for example, by the restoring element or may be assisted thereby. Alternatively or additionally, the movement of the valve body into the closed position may also be achieved by the valve body being urged by the fluid pressure into the closed position, when the dispensing nozzle is introduced into a filler neck without a ring magnet.

In particular, the aforementioned default adjustment of the flow limiter to the first maximum volumetric flow rate may be achieved by the movement of the valve body into the closed position generated by the restoring element or by the fluid pressure. If the dispensing nozzle is introduced into a filler neck which has a ring magnet, a magnetic force acts between the ring magnet and the magnetic element. In the preferred embodiment described in the present case, the magnetic force acting between the ring magnet and the magnetic element is designed to move the valve body into the open position counter to a closing force generated by the fluid pressure and by the optionally present restoring element, and also to keep the valve body there counter to the closing forces generated by the fluid pressure.

Preferably, a flow guidance device which is designed to reduce a closing force exerted by fluid flowing onto the valve body is arranged upstream of the valve body. To this end the flow guidance device may have, in particular, guide surfaces which are inclined relative to an axial direction of the valve body. The guide surfaces may also be configured to deflect the fluid flow in the radial direction (i.e. perpendicular to the axial direction of the valve body) from a rear surface of the valve body facing upstream, so that preferably at least one part of the fluid flow is conducted past the rear surface. For example, it may be provided that the guide surfaces are designed to deflect radially outwardly the fluid flow from an axis running centrally through the valve body. As a result, a lateral incident flow onto the valve body may be ensured, whereby the closing forces generated by the fluid are reduced.

A mobility of the valve body may be limited by a stop in the upstream direction. By limiting the mobility of the valve body, said valve body adopts a defined position in the open position.

Preferably, a bypass channel which bridges the flow limiter is provided. Due to the bypass channel the flow limiter does not entirely prevent the fluid flow through the dispensing nozzle but merely brings about a reduction in the fluid flow. The bypass channel is preferably configured to allow the passage of the first maximum volumetric flow rate when the flow limiter is closed. The bypass channel may have a through-opening for the fluid flow extending through the valve body. Alternatively or additionally, the bypass channel may also have a side branch which is spaced apart from the flow limiter and which runs parallel to a fluid flow passing through the open flow limiter.

The dispensing nozzle may have a safety valve which is arranged downstream of the flow limiter and which is urged into a closed position downstream by a restoring element, wherein the safety valve is movable into an open position by the interaction with a filler neck of the tank. Such a safety valve is disclosed, for example, in EP 2 733 113 A1. Preferably, the dispensing nozzle also has an automatic switch-off device which automatically interrupts the refuelling process when the tank is full. To this end, a sensor line which extends to the outlet end of the dispensing nozzle and which is operatively connected by pneumatic means to the automatic switch-off device may be provided. Details of the design of such an automatic switch-off device are found, for example, in EP 2 386 520 A1. The safety valve additionally serves as an anti-drip valve in order to prevent, for example, the undesired escape of residual quantities of fluid when the main valve is closed.

In particular, it may be provided that the actuating device is configured to be displaceable relative to a valve stem of the safety valve, wherein the valve stem of the safety valve preferably has a cavity in which the magnetic element of the actuating device is displaceably arranged. It has been shown that the arrangement of the magnetic element inside the valve stem of the safety valve permits a particularly space-saving construction. If the actuating device has a transmission rod, this transmission rod may be passed through a through-opening in a rear wall of the valve stem.

A further subject of the invention is an arrangement consisting of a dispensing nozzle according to the invention and a fluid pump which is attached to the dispensing nozzle for supplying the fluid. The dispensing nozzle may be developed by further features disclosed within the context of the present description.

A preferred embodiment of the dispensing nozzle according to the invention is described hereinafter by way of example with reference to the accompanying figures, in which:

FIG. 2*a-b*: shows a spout of the dispensing nozzle according to the invention of FIG. 1 in an enlarged view.

Figure 1:
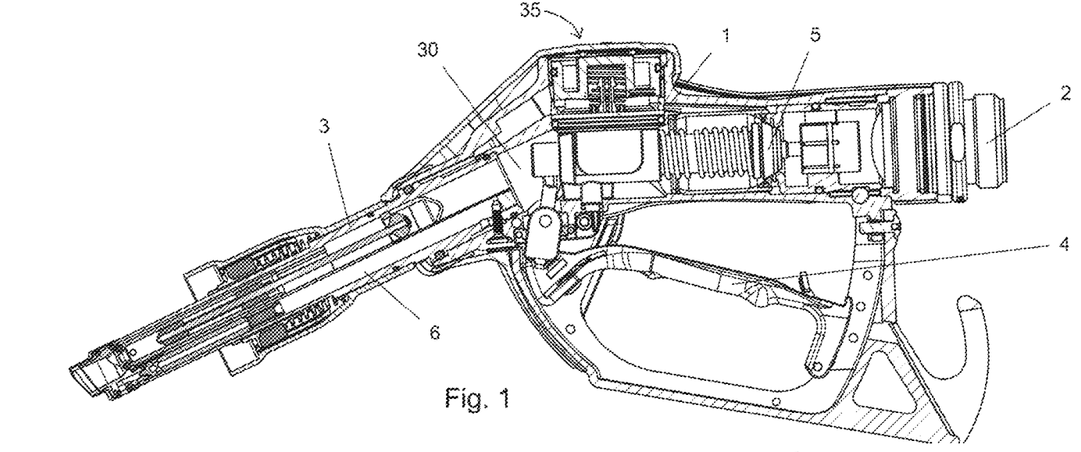
FIG. 1: shows a lateral sectional view of a dispensing nozzle according to the invention in a first state.

FIG. 1 shows a lateral sectional view of a dispensing nozzle according to the invention. The dispensing nozzle comprises a housing 1 in which a channel 30 is formed for passing through a fluid. Via an inlet 2 a hose for supplying the fluid may be connected to the dispensing nozzle (not shown). A main valve 5 which may be actuated via a switch lever 4 is arranged in the channel 30. In FIG. 1 the main valve 5 is in the closed position in which the fluid flow through the dispensing nozzle is blocked.

A spout 3 according to the invention is connected to the housing 1. The spout 3 may be introduced into a filler neck of a tank for discharging the fluid. The dispensing nozzle is suitable, in particular, for discharging an aqueous urea solution into the tank of a vehicle.

An automatic switch-off device 35 is operatively connected to the main valve 5, the main valve 5 being able to be moved by said automatic switch-off device into the closed position irrespective of the position of the switch lever 4. A sensor line 6 which is operatively connected to the switch-off device 35 by pneumatic means is additionally located in the spout 3. If during the discharge of the fluid the fluid filling state reaches the front end of the spout, and thus covers the sensor line 6, a pressure change associated therewith leads to a triggering of the automatic switch-off device 35 and thus to a closing of the main valve 5. The mode of operation of the automatic switch-off device 35 is known in principle (see for example EP 2 386 520 A1) and is not intended to be explained here in more detail.

A safety valve 7 which has a valve stem 9 and which closes downstream against the valve seat 15 (see FIG. 4) is also provided in the region of the outlet end of the spout 3. The end of the valve stem 9 facing upstream is provided with a magnet 10.

The spout 3 also has a sleeve 11 which is displaceable in the axial direction thereof and which is pretensioned by a spring 12 into the blocked position shown in FIG. 1. A ring magnet 13 is arranged on the sleeve 11, said ring magnet urging the valve stem 9 and the safety valve 7 by magnetic interaction with the magnet 10 into the closed position shown in FIGS. 1 and 2.

The sensor line 6 has a sensor line valve 17 with a valve stem 18 which is arranged on the outlet side end and which with its outlet side end closes against a valve seat. The valve stem 18 comprises at the opposing end an actuating magnet 19 which keeps the valve stem 18 in the closed position by interacting with the operative magnet 13.

Figure 2:
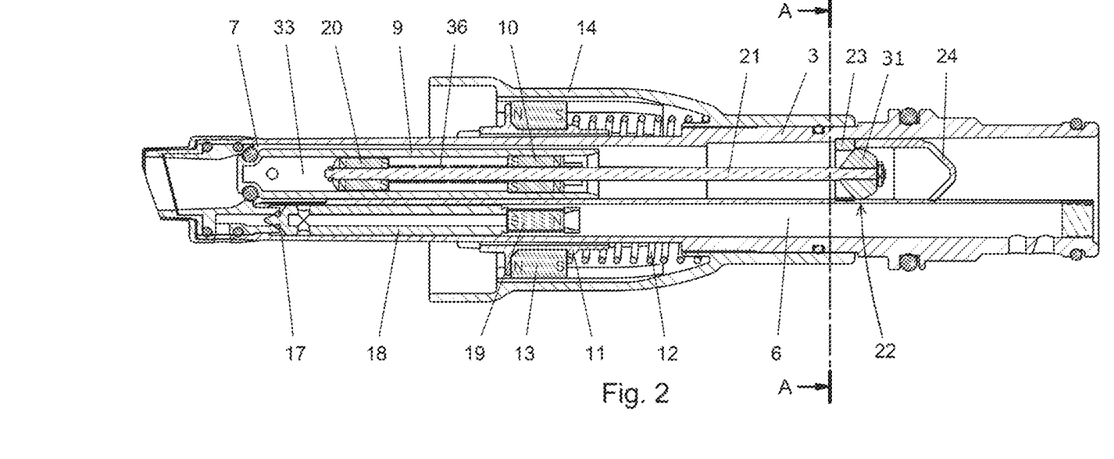

In the state shown in FIGS. 1 and 2, the channel 30 is closed by the safety valve 7. Moreover, the sensor line 6 is closed by the sensor line valve 17. If the main valve 5 is actuated in this state by means of the switch lever 4, a discharge of the fluid is prevented since the spout is closed by the safety valve 7.

An adjustable flow limiter which is configured in the present case by a throttle valve 22 is also located in the spout 3. By means of the throttle valve 22 a fluid flow through the dispensing nozzle or, respectively, through the spout 3 may be selectively limited to a first maximum volumetric flow rate or a second maximum volumetric flow rate. The throttle valve 22 has a valve body 31 which is connected by means of a transmission rod 21 to a magnetic element 20. The magnetic element 20 is arranged in a cavity 33 inside the valve stem 9 of the safety valve 7 and is displaceable relative to the valve stem 9 in the axial direction of the spout 3. The transmission rod 21 is also displaceable relative to the valve stem 9 and guided through a through-opening located in a rear wall of the valve stem 9 facing upstream.

The magnetic element 20 and the transmission rod 21 together form an actuating device for the throttle valve 22. In the state shown in FIGS. 1 and 2, the valve body is located in a closed position in which it bears downstream against a valve seat 23 of the throttle valve 22. The valve body 31 is urged downstream relative to the valve stem 9 by a restoring element 36 and as a result clamped in the valve seat 23. The mode of operation of the actuating device 20, 21 and the adjustment of the throttle valve 22 to the second maximum volumetric flow rate is explained in more detail in connection with FIGS. 3 to 6.

Figure 3:
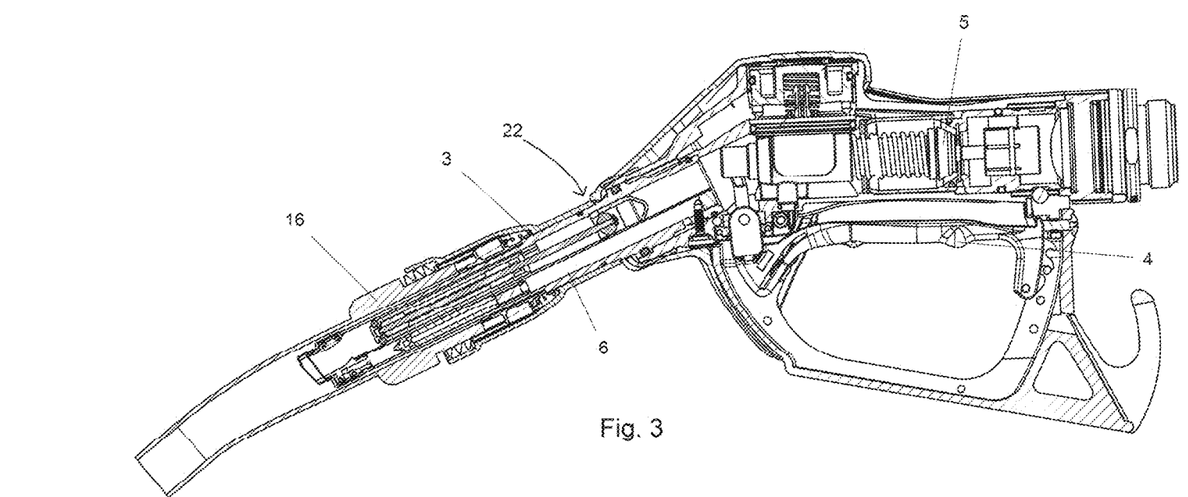
FIG. 3: shows the dispensing nozzle of FIG. 1 in a second state.
Figure 4:
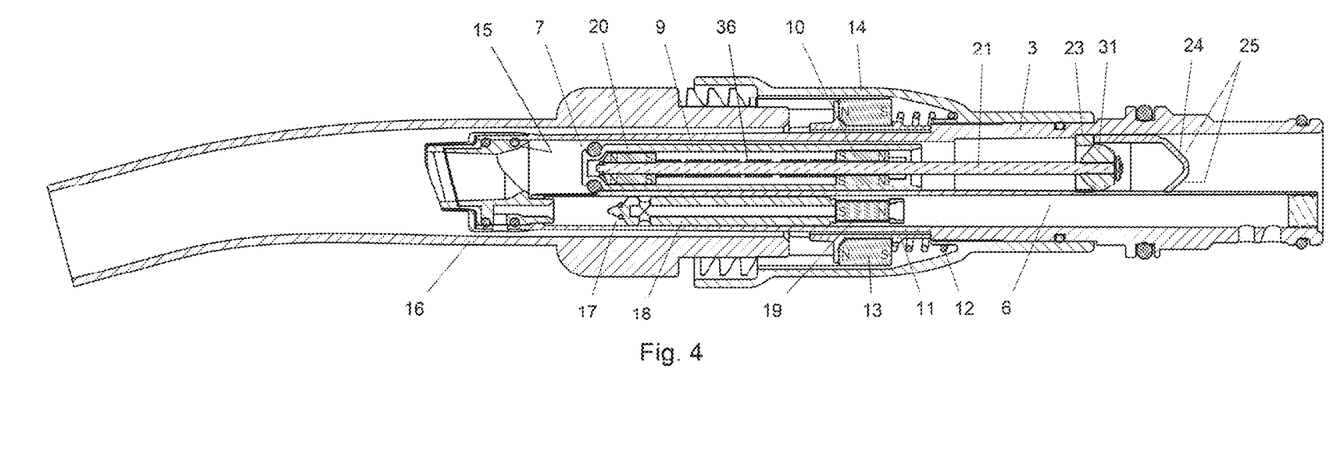
FIG. 4: shows the spout of the dispensing nozzle of FIG. 3 in an enlarged view.

FIGS. 3 and 4 show the dispensing nozzle of FIG. 1 and the spout thereof, after the introduction thereof into a filler neck 16 of the tank. In contrast to FIGS. 1 and 2, the main valve 5 has also been moved into an open position by actuating the switch lever 4. The filler neck 16 in the present case is the filler neck of a urea tank of a passenger motor vehicle according to ISO 22241-5 without a ring magnet.

The filler neck 16 is configured in a manner known in principle (see EP 3 369 700 A1) to displace the sleeve 11, when the spout 3 is introduced relative thereto, upstream from the blocked position shown in FIGS. 1 and 2 into an open position. With the displacement of the sleeve 11, the operative magnet 13 connected thereto also moves upstream relative to the spout 3, wherein by magnetic interaction said operative magnet entrains the magnet 10 fixed to the valve stem 9 and the actuating magnet 19 fixed to the valve stem 18 and thus opens the sensor line valve 17 and the safety valve 7.

Figure 2A:
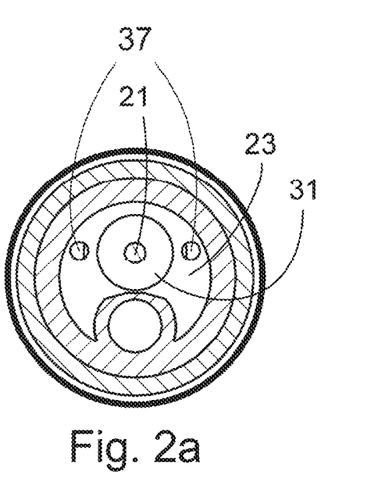
FIG. 2*a*: shows a sectional view along the line A-A shown in FIG. 2.
Figure 2B:
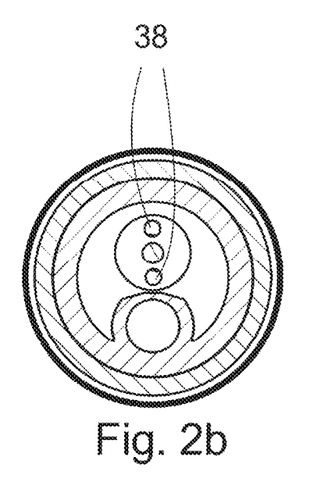
FIG. 2*b*: shows a sectional view along the line A-A shown in FIG. 2 for illustrating a further embodiment of the dispensing nozzle according to the invention which has an alternative flow limiter.

The magnetic element 20 is removed sufficiently far from the operative magnet 13 that it is not influenced by the displacement of the operative magnet 13, or only in a negligible manner. Since the magnetic element 20, the transmission rod 21 and the valve body 31 connected thereto are movable relative to the valve stem 9 and urged by the restoring element 36 into the closed position, the valve body 31 remains in the closed position. Through-holes 37 which are illustrated in the sectional view of FIG. 2a are located in the valve seat 23. Even in the closed position of the valve body 31 a specific volumetric flow rate may pass through the spout 3 through the through-holes 37. This specific volumetric flow rate is at most as large as the first maximum volumetric flow rate of the throttle valve which in the present case is 9 l/min. The volumetric flow rate passing through the opening of the main valve 5 is thus limited by the closed throttle valve 22 to the first maximum volumetric flow rate of the dispensing nozzle. Additionally or alternatively to the through-holes 37 located in the valve seat 23, through-holes 38 may also be provided in the valve body 31 in an alternative embodiment. This is illustrated by way of example in FIG. 2b which shows a sectional view corresponding to FIG. 2a.

Figure 5:
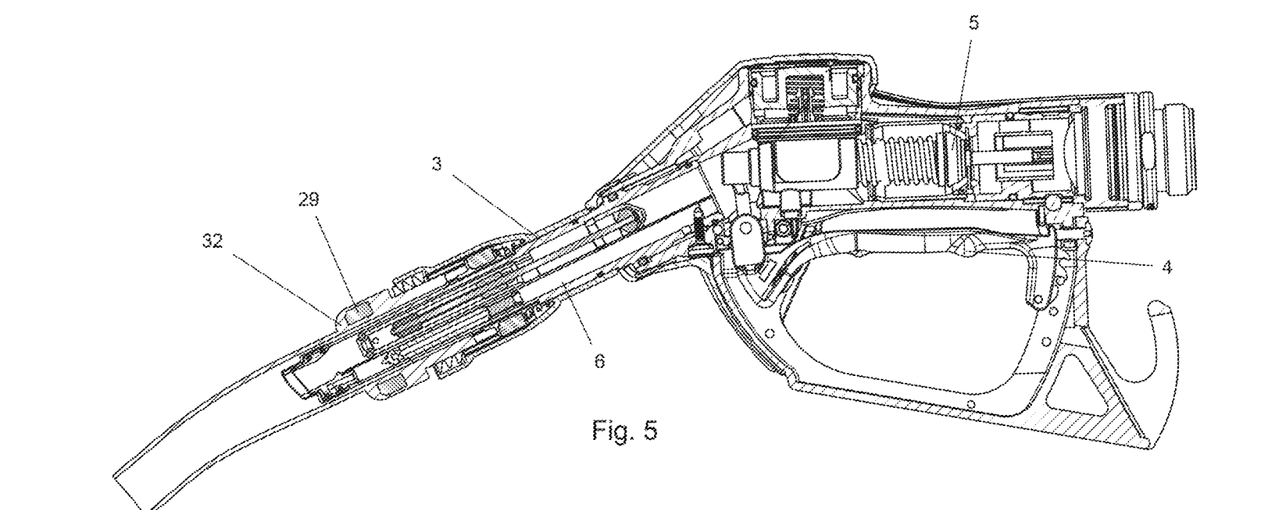
FIG. 5: shows the dispensing nozzle of FIG. 1 in a third state.
Figure 6:
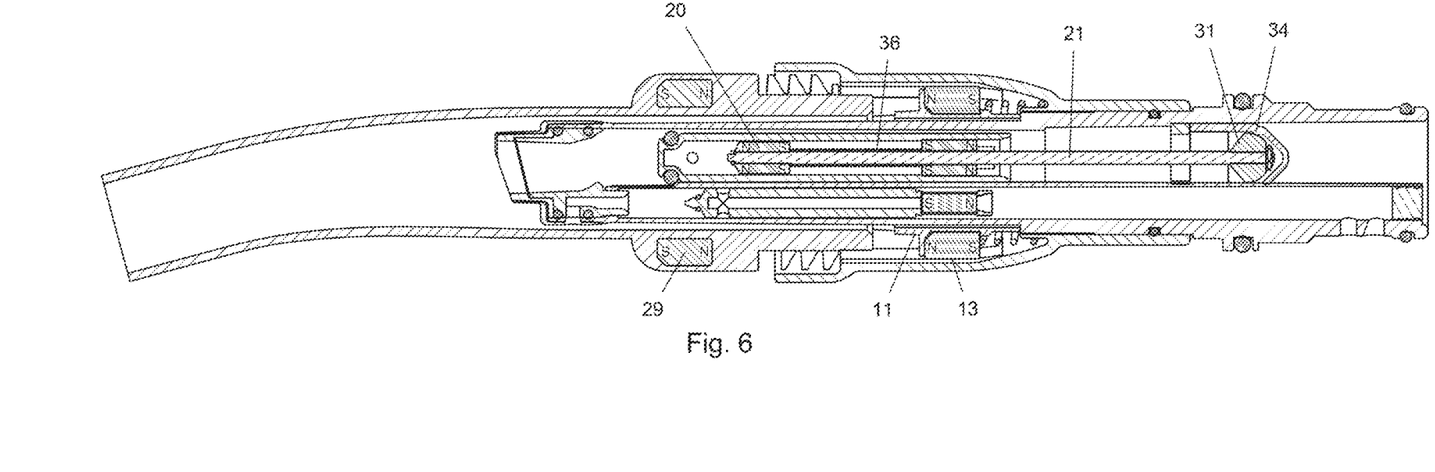
FIG. 6: shows the spout of the dispensing nozzle of FIG. 5 in an enlarged view.

FIGS. 5 and 6 show the dispensing nozzle of FIG. 1 and the spout thereof after the introduction thereof into a filler neck 32, which in contrast to the filler neck 16 of the FIGS. 3 and 4 is the filler neck of a urea tank of a passenger motor vehicle according to ISO 22241-4 with a ring magnet 29. In a similar manner to FIGS. 3 and 4, the main valve 5 is in an open position.

When the spout is introduced, the sleeve 11, as already described in connection with FIGS. 3 and 4, is displaced by the filler neck 32 relative to the spout 3 so that both the sensor line valve 17 and the safety valve 7 are opened by the interaction between the operative magnet 13 and the magnets 10 and 19.

Moreover, in the present case it results in an interaction between the ring magnet 29 and the magnetic element 20. In particular, the ring magnet 29 and the magnetic element 20 are arranged such that, when the spout 3 is introduced into the filler neck 32, like poles initially oppose one another and thus a repelling force is exerted on the magnetic element 20. The magnetic element 20 in this case is designed such that the magnetic force exceeds the opposing restoring force of the restoring element 36. The repelling force thus leads to a displacement of the magnetic element 20 in the upstream direction relative to the spout 3. Due to the connection of the magnetic element 20 to the valve body 31, formed by the transmission rod 21, the valve body is moved counter to the restoring force of the restoring element 36 into an open position. The movement of the valve body 31 is limited upstream by a stop 34.

In the open position of the throttle valve 22, with a predetermined fluid pressure at the inlet of the dispensing nozzle, a greater volumetric flow may pass through the spout than in the closed position shown in FIGS. 3 and 4. In particular, in the state shown the throttle valve 22 is designed with a sufficient opening of the main valve 5 to allow the second maximum volumetric flow rate through the spout 3, which in the present case is approximately 20 l/min. The magnetic force acting between the ring magnet 29 and the magnetic element 20 is sufficiently great that the valve body 31 is held in the open position counter to the fluid pressure and counter to the restoring force of the restoring element 36. A flow guidance device 24, which in the embodiment shown is integrally configured with the stop 34, is provided in order to reduce the force exerted by the fluid flowing onto the valve body 31. In alternative embodiments, the stop 34 and the flow guidance device 24 may also be formed by separate elements.

The flow guidance device 24 has relative to the axial direction of the valve body 31 inclined guide surfaces 25 which are configured to divert outwardly the fluid from an axis running centrally through the valve body 31 (which in the present case coincides with the longitudinal axis of the transmission rod 21). The guide surfaces 25 have through-openings for the fluid which are not identifiable in the figures and which are arranged radially outwardly when viewed from the axis running centrally through the valve body. The fluid flow is diverted outwardly by the flow guidance device 24 inside the channel 30 so that only a reduced dynamic pressure or, respectively, back pressure acts on the central rear surface of the valve body 31. The closing force exerted by the fluid onto the valve body 31 is thereby reduced.

The invention claimed is:

1. A dispensing nozzle for dispensing a fluid into a tank of a motor vehicle, comprising the following features:
the dispensing nozzle comprises a channel (30) for passing through the fluid, wherein a main valve (5) is arranged in the channel (30), said main valve being movable between a closed position and an open position for controlling a fluid flow,
the dispensing nozzle comprises a first maximum volumetric flow rate and a second maximum volumetric flow rate, wherein the second maximum volumetric flow rate is greater than the first, and the first maximum volumetric flow rate is greater than zero,
the dispensing nozzle comprises an adjustable flow limiter (22) which is configured separately from the main valve (5) and which is configured to limit the fluid flow selectively to the first or second maximum volumetric flow rate,
the dispensing nozzle comprises an actuating device (20, 21) which is configured for interaction with a signal element (29) which is assigned to the tank of the motor vehicle and for the selective adjustment of the flow limiter (22) to the first or the second maximum volumetric flow rate.

2. Dispensing nozzle according to claim 1, wherein the flow limiter (22) is arranged downstream of the main valve.

3. Dispensing nozzle according to claim 1, wherein the first maximum volumetric flow rate is less than 15 l/min, and/or wherein the second maximum volumetric flow rate is less than 50 l/min.

4. Dispensing nozzle according to claim 1, wherein the flow limiter (22) is adjusted by default to the first maximum volumetric flow rate, wherein the second maximum volumetric flow rate is only adjusted when the actuating device (20, 21) detects the signal element (29).

5. Dispensing nozzle according to claim 1, wherein the signal element is a ring magnet, and the actuating device is configured for interaction with the ring magnet (29) of a filler neck according to ISO 22241-4.

6. Dispensing nozzle according to claim 1, wherein the actuating device has a displaceably arranged magnetic element (20) which is designed for mechanically actuating the flow limiter (22).

7. Dispensing nozzle according to claim 6, wherein the magnetic element (20) is connected by a mechanical signal transmission device (21) to a valve body (31) of the flow limiter (22), wherein the valve body (31) is movable in a first direction when the flow limiter (22) is actuated by the signal transmission device (21).

8. Dispensing nozzle according to claim 7, wherein the flow limiter (22) has a valve seat (23), wherein the valve body (31) is movable downstream into a closed position in which it bears against the valve seat (23).

9. Dispensing nozzle according to claim 8, wherein the valve body (31) is movable into the closed position for selectively limiting the fluid flow to the first maximum volumetric flow rate and into an open position for selectively limiting the fluid flow to the second maximum volumetric flow rate.

10. Dispensing nozzle according to claim 7, wherein a stop (34) is arranged upstream of the valve body (31) for limiting the mobility of the valve body (31).

11. Dispensing nozzle according to claim 7, wherein a flow guidance device (24) which is designed to reduce a closing force exerted by fluid flowing onto the valve body (31) is arranged upstream of the valve body (31).

12. Dispensing nozzle according to claim 1, wherein a bypass channel which bridges the flow limiter (22) is provided, said bypass channel being configured to allow the passage of the first maximum volumetric flow rate when the flow limiter (22) is closed.

13. Dispensing nozzle according to claim 1, which has a safety valve (7) which is arranged downstream of the flow limiter (22) and which is urged into a closed position downstream by a restoring element, wherein the safety valve (7) is movable into an open position by the interaction with a filler neck of the tank.

14. A spout for a dispensing nozzle for dispensing a fluid into a tank of a motor vehicle, comprising the following features:
the spout comprises a channel for passing through the fluid,
the spout comprises a first maximum volumetric flow rate and a second maximum volumetric flow rate, wherein the second maximum volumetric flow rate is greater than the first, and the first maximum volumetric flow rate is greater than zero,
the spout comprises an adjustable flow limiter (22) which is configured to limit the fluid flow selectively to the first or second maximum volumetric flow rate,
the spout comprises an actuating device (20, 21) which is configured for interaction with a signal element (29) which is assigned to the tank of the motor vehicle and for the selective adjustment of the flow limiter (22) to the first or the second maximum volumetric flow rate.

15. Arrangement comprising a dispensing nozzle according to claim 1 and a fluid pump which is attached to the dispensing nozzle for supplying the fluid.

16. Dispensing nozzle according to claim 2, wherein the flow limiter (22) is arranged downstream of the main valve in a spout (3) of the dispensing nozzle.

17. Dispensing nozzle according to claim 3, wherein the first maximum volumetric flow rate is within a range of 5 l/min to 10 l/min, and/or wherein the second maximum volumetric flow rate is within a range of 20 l/min to 40 l/min.

18. Dispensing nozzle according to claim 8, further including a restoring element (36), said restoring element being connected to the valve body (31) and configured to urge the valve body (31) in a direction opposing the first direction, wherein the valve body (31) is further urged by the restoring element (36) into the closed position.

19. Dispensing nozzle according to claim 12, wherein the bypass channel has at least one through-opening (38) for the fluid flow extending through the valve body (31) and/or at least one through-opening (37) for the fluid flow extending through the valve seat (23).

20. Dispensing nozzle according to claim 13, wherein the actuating device (20, 21) is configured to be displaceable relative to a valve stem (9) of the safety valve (7), and wherein the valve stem (9) of the safety valve (7) has a cavity (33) in which the magnetic element (20) is displaceably mounted.

* * * * *